United States Patent
Hieke

(10) Patent No.: US 9,702,746 B2
(45) Date of Patent: Jul. 11, 2017

(54) DEVICE FOR MONITORING A MASS OR VOLUME FLOW OF A GAS STREAM

(71) Applicant: Dräger Safety AG & Co. KGaA, Lübeck (DE)

(72) Inventor: Florian Hieke, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 254 days.

(21) Appl. No.: 14/570,247

(22) Filed: Dec. 15, 2014

(65) Prior Publication Data

US 2015/0168194 A1 Jun. 18, 2015

(30) Foreign Application Priority Data

Dec. 16, 2013 (DE) .................. 10 2013 020 904

(51) Int. Cl.
| | | |
|---|---|---|
| G01F 1/684 | (2006.01) | |
| G01F 1/69 | (2006.01) | |
| A62B 9/00 | (2006.01) | |
| G01F 1/688 | (2006.01) | |
| A62B 18/00 | (2006.01) | |

(52) U.S. Cl.
CPC ............ G01F 1/6888 (2013.01); A62B 9/006 (2013.01); G01F 1/684 (2013.01); G01F 1/69 (2013.01); A62B 18/006 (2013.01)

(58) Field of Classification Search
None
See application file for complete search history.

(56) References Cited

U.S. PATENT DOCUMENTS

| | | | |
|---|---|---|---|
| 4,890,489 A * | 1/1990 | Huijsing | G01F 1/6845 73/170.12 |
| 6,272,933 B1 | 8/2001 | Gradon et al. | |
| 2012/0025748 A1* | 2/2012 | Damsgaard | H02P 1/426 318/781 |
| 2014/0137737 A1* | 5/2014 | Wilkinson | A61M 16/10 95/130 |
| 2015/0320954 A1* | 11/2015 | Suzuki | F04D 25/0646 128/204.21 |

FOREIGN PATENT DOCUMENTS

| | | |
|---|---|---|
| DE | 10 234 811 C1 | 11/2003 |
| DE | 10 2007 039 391 A1 | 2/2009 |

* cited by examiner

*Primary Examiner* — Daniel J Colilla
(74) *Attorney, Agent, or Firm* — McGlew and Tuttle, P.C.

(57) ABSTRACT

A device for monitoring a mass or volume flow, in a gas stream with a feed line and with a plurality of electrical components, includes a flow generator, a heat-sensitive element and a data processing unit. The flow generator generates a gas stream flowing in a direction of flow through the feed line. At least one of the electrical components comprises at least one electrical element for power data supply, which is arranged in the feed line such that a waste heat of the electrical element heats the gas stream generated by the flow generator. The heat-sensitive element is arranged behind the electrical element in the direction of flow in the feed line and detects a temperature of the gas stream heated by the waste heat of the electrical element. The data processing unit determines a mass or volume flow from the temperature detected by the heat-sensitive element.

12 Claims, 2 Drawing Sheets

US 9,702,746 B2

DEVICE FOR MONITORING A MASS OR VOLUME FLOW OF A GAS STREAM

CROSS REFERENCE TO RELATED APPLICATIONS

This application claims the benefit of priority under 35 U.S.C. §119 of German Patent Application DE 10 2013 020 904.8 filed Dec. 16, 2013, the entire contents of which are incorporated herein by reference.

FIELD OF THE INVENTION

The present invention pertains to a device for monitoring a mass or volume flow of a gas stream with a feed line and with a plurality of electrical components, wherein the plurality of electrical components comprises at least one flow generator, a first heat-sensitive element and a data processing unit, wherein the flow generator is arranged and set up such that the flow generator can generate a gas stream flowing in a direction of flow through the feed line, and wherein at least one of the electrical components comprises at least one electrical element for power and/or data supply.

BACKGROUND OF THE INVENTION

In many devices in which a gas stream is generated, the mass or volume flow of this gas stream must be monitored for safety reasons. Examples of such a device are, among other things, gas-measuring devices, i.e., devices for measuring a concentration of a gas in a gas stream, in which a measuring chamber is supplied with a gas stream via a feed line, but also blower filter devices, which supply a user with filtered air.

For example, it happens regularly, in gas measuring technology, that the measuring device, i.e., a device for measuring a concentration of one or more gases in a gas mixture, cannot be brought to the site at which the concentration of the gas or gases in the gas mixture shall be determined. This site is also called the measuring site. The reasons herefor are numerous. For example, there may be no supply lines at the measuring site or no space is simply available at which a device for measuring a concentration of one or more gases could be permanently arranged. The measuring devices are also used in other cases to ensure that the concentration of a harmful or hazardous gas is below a limit or threshold value at a measuring site. The device, especially if the device is a portable or mobile device, cannot be brought directly to the measuring site in this case, either. The measuring site also often does not correspond to the position of the measuring device when leaks are sought.

A measuring chamber of the device, in which a sensor element is arranged for determining a concentration of at least one gas in the gas stream, is often supplied with the gas mixture in a manner other than by diffusion. The gas stream is fed, instead, actively via a flow generator, for example, a pump, via a feed line. To ensure that the device measures correctly, it is important that a sufficient quantity of fresh gas be transported from the measuring site into the measuring chamber and to the sensor element. In other words, the mass or volume flow of the gas stream generated by the flow generator, which flow flows into the measuring chamber through the feed line, must be monitored.

It is known in the state of the art that differential pressure-based or heat conduction-based sensors can be arranged for this in the feed line for determining the mass or volume flow. Not only is it expensive to manufacture these sensors, as a result of which they make the devices more expensive, but they also need additional energy during the operation. Additional heating elements must be arranged in the gas stream especially if heat conduction-based sensors are used in order to heat the gas stream. However, the energy consumption of these heating elements is not negligible. This is especially relevant when the device for determining a concentration of a gas is a portable or mobile device, in which the entire quantity of energy consumed is provided by means of batteries. Thus, the energy demand of the heating elements shorten either the operating time of the device, or batteries having a higher capacity, which increase the weight of the portable device, must be used. It is meaningful to reduce the power consumption not only from the viewpoint of increasing power costs, but for ecological reasons as well even in stationary devices that have a permanent energy supply.

SUMMARY OF THE INVENTION

An object of the present invention is therefore to provide a device for determining a mass or volume flow of a gas stream, which has a lower energy consumption compared to the devices known from the state of the art.

The object is accomplished by a device for monitoring a mass or volume flow of a gas stream, in which the electrical element is arranged in the feed line such that a waste heat of the electrical element heats the gas stream generated by the flow generator. The first heat-sensitive element in the feed line is arranged behind the electrical element in the direction of flow. The first heat-sensitive element is set up (configured) to detect a temperature of the gas stream generated by the flow generator and heated by the waste heat of the electrical element. The data processing unit is set up to determine a mass or volume flow of the gas stream from the temperature detected by the first heat-sensitive element.

The device according to the present invention may be, for example, a gas measuring device or a blower filter device. The device comprises a plurality of electrical components, where electrical components are defined as components of the device whose operation requires supply with electrical voltage or power. The device comprises as electrical components at least one flow generator, a first heat-sensitive element and a data processing unit. Each of these components is connected with a power or voltage source. In addition, data lines for sending and receiving data may also be presented between individual components.

The flow generator, which is, for example, a pump or a blower, generates the gas stream, which flows through the feed line in a direction of flow. The flow generator may be arranged for this, for example, in the area of an opening of the feed line, with which the gas is received at a measuring or working site. However, it is just as easy to provide the flow generator arranged behind the feed line in the direction of flow, i.e., for example, between an outlet of the feed line and the ambient air. Depending on the site at which the flow generator is arranged, the latter can be operated either in a suction mode or in a delivery mode. It is also conceivable that the feed line is divided into two and one part of the feed line is arranged in front of the flow generator in the direction of flow and another part of the feed line is arranged behind the flow generator in the direction of flow.

The device comprises, furthermore, an electrical element, which is part of the power and/or data supply of one of the electrical components. In a preferred embodiment, it is at least one protective resistor of a motor for driving a pump, which is used as the electrical element that heats the gas stream generated by the flow generator. However, it is also conceivable that it is another electrical element, which is used, for example, an electrical element in the power supply of the data processing unit may be used. The electrical element is arranged in the feed line, so that heat released by the electrical element, which is also called waste heat, heats the gas stream generated by the flow generator. The electrical element may be arranged both in front of the flow generator in the direction of flow and behind the flow generator in the direction of flow. Especially good heat coupling is provided now between the electrical element and the gas stream.

The first heat-sensitive element is, for example, a thermal (so-called NTC resistor), a barretter (so-called PTC resistor) or a thermocouple. The first heat-sensitive element is arranged in the feed line such that the gas stream heated by the waste heat of the electrical element flows past the heat-sensitive element, so that the heat-sensitive element can detect a temperature of the gas stream. The first heat-sensitive element may be arranged both in front of the flow generator in the direction of flow and behind the flow generator in the direction of flow. The first heat-sensitive element and the electrical element are preferably arranged in the direction of flow on the same side of the flow generator. However, this is not necessarily so. It is also conceivable that the first heat-sensitive element is arranged behind the flow generator in the direction of flow, while the electrical element is arranged in front of the flow generator in the direction of flow. The detection of a temperature is not necessarily defined here such that the heat-sensitive element has a data line and already outputs a temperature of the gas stream with a predetermined accuracy via this data line. It is rather sufficient to be able to measure a voltage drop over the heat-sensitive element, so that an approximate temperature of the gas stream can be inferred from the resistance thereof.

Furthermore, the data processing unit is set up to determine a volume or mass flow of the gas stream from the temperature detected by the first heat-sensitive element. The term "determination of a mass or volume flow" is to be understood in a broad sense of the word. Depending on application, it may already be sufficient for the data processing unit to determine only whether the mass or volume flow is above or below a critical value. In an alternative, exemplary embodiment, the data processing means is set up to determine the mass or volume flow and to output it via an output unit with a predetermined accuracy. The data processing unit may be, for example, a conventional PC or an integrated circuit.

The device according to the present invention is advantageous, because no additional heating element is needed for heating the gas stream in the feed line, but the waste heat of the electrical element, which is necessary anyway, is used. Thus, not only is the number of components that are needed for manufacturing the device reduced, but power is saved as well, because no additional heating element has to be heated. Not only is the lower energy consumption of the device advantageous from ecological points of view, but it also makes it possible at the same time to prolong the operating time in case of mobile or portable devices that are operated with batteries. As an alternative, it is also possible to use lighter batteries or batteries with a lower capacity without reducing thereby the operating time of the device. Thus, the weight of the device can be advantageously reduced. Moreover, the electrical element is cooled by the gas stream, for which additional measures must sometimes be taken in devices known from the state of the art.

In a preferred embodiment, one of the electrical components comprises a plurality of electrical elements for power and/or data supply, which are arranged in front of the first heat-sensitive element in the feed line in the direction of flow such that a waste heat of the electrical elements heats the gas stream generated by the flow generator. The first heat-sensitive element is arranged and set up such that it detects a temperature of the gas stream generated by the flow generator and heated by the waste heat of the electrical elements. This embodiment is especially preferred because the gas stream is advantageously heated more intensely by the waste heat of a plurality of electrical elements and these [elements] are cooled at the same time, without additional electrical energy being consumed.

It is especially preferred if the flow generator comprises a motor with a plurality of electrical elements in the form of protective resistors and the protective resistors form the electrical elements, which are arranged in the feed line. The preferred embodiment may be, for example, part of a gas measuring device or of a blower filter device, which are of the explosion proof type "ib" or even "ia." These devices are intrinsically safe even in case of one or two errors. The power, with which the drive or motor of the flow generator is operated, is limited for this via two or three protective resistors. The waste heat of these protective resistors must be removed from the device in a complicated manner in devices known from the state of the art. By contrast, the waste heat is advantageously used in the device according to the present invention to heat the gas stream.

In a preferred embodiment, a plurality of the electrical components comprise at least one electrical element for power and/or data supply, which are arranged in front of the first heat-sensitive element in the feed line in the direction of flow such that a waste heat of the electrical elements heats the gas stream generated by the flow generator. The first heat-sensitive element is arranged and set up in this case such that it detects a temperature of the gas stream generated by the flow generator and heated by the waste heat of the electrical elements. In other words, the first heat-sensitive element is arranged behind the electrical elements with respect to the direction of flow. Electrical elements that are absolutely needed for the power and/or data supply of a plurality of electrical components are cooled by the gas stream generated by the flow generator and this gas stream is heated at the same time by the waste heat of the electrical elements in the preferred embodiment.

In a preferred embodiment, the device comprises a second heat-sensitive element. The second heat-sensitive element is arranged in front of the electrical component or the electrical components in the feed line in the direction of flow and is set up to detect a temperature of a gas stream not heated by the waste heat of the electrical element or electrical elements. The data processing unit is set up to determine a direction of flow of the gas stream from the temperature detected by the first heat-sensitive element and the second heat-sensitive element. In other words, the second heat-sensitive element is provided, which is designed, for example, in the form of a thermal resistor, a barretter or a thermocouple. The second heat-sensitive element is arranged in the feed line between an opening of the feed line, through which a gas stream enters the feed line, for example, from a measuring site, and the electrical element or the electrical elements. The second heat-sensitive element may be arranged in this case in front of or behind the flow generator in the direction of flow. The second heat-sensitive element is preferably arranged in the direction of flow on the same side of the flow generator as the first heat-sensitive element and the heat-sensitive element or heat-sensitive elements. However, it is also conceivable that the second heat-sensitive element is arranged in front of the flow generator in the direction of flow, while the first heat-sensitive element is arranged behind the flow generator in the direction of flow. The detection of a temperature is not necessarily defined as the determination of a temperature in degrees Celsius or Kelvin in this case, either. It is also possible to measure only a voltage drop over a resistor, which is correlated with a temperature of the resistor. It should be borne in mind that the designation of the heat-sensitive elements also changes with changing direction of flow.

The direction of flow of the flowing gas can be advantageously determined from the temperature difference between the first and second heat-sensitive elements. In addition, the accuracy with which the mass or volume flow is determined is improved, because a temperature of the gas stream is measured already before this is heated by the waste heat of the electrical element or electrical elements. In addition, the device can be used in a more versatile manner, because, assuming a corresponding flow generator, the gas stream can flow through the device in two different directions and the mass or volume flow can be determined for both directions.

In a preferred embodiment, the device comprises a measuring chamber, and the plurality of electrical components comprise a sensor element, wherein the measuring chamber is in fluidic connection with the feed line and the flow generator is arranged and set up such that the gas stream flowing in the direction of flow also flows through the measuring chamber, and wherein the sensor element is arranged at or in the measuring chamber and is set up to measure the concentration of at least one gas in the gas stream generated by the flow generator.

In a preferred embodiment of the device, the device is, for example, a portable or mobile gas measuring device, with an electrical energy demand that is fully provided by batteries. However, it may just as well be a stationary gas measuring device, which is permanently connected to a power or voltage supply network. In any case, the device comprises a measuring chamber, into which a gas stream or gas flow is fed via a feed line. The measuring chamber and the feed line are in fluidic connection with one another for this. They are consequently fluidically connected with one another. The feed line has at least one opening, via which it can receive or also release a gas at a measuring site. A measuring chamber is not necessarily defined as a separate space that is separated from the feed line. The measuring chamber may also be a section of the feed line, in which or at which the sensor element is arranged.

The sensor element is arranged in or at the measuring chamber and is set up to measure the concentration of at least one gas in the gas stream generated by the flow generator. For example, the sensor element may be set up to measure the concentration of carbon dioxide and/or carbon monoxide and/or combustible gases in the gas stream. The sensor element may be formed, for example, by a sensor based on electrochemical or infrared optical principles of measurement, but heat tone and semiconductor sensors as well as band measuring devices are equally suitable as well.

In a preferred embodiment, the device is a gas measuring and/or gas warning means.

An alternative preferred embodiment of the device according to the present invention is a blower filter device.

The present invention will be explained below on the basis of a drawing showing preferred exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
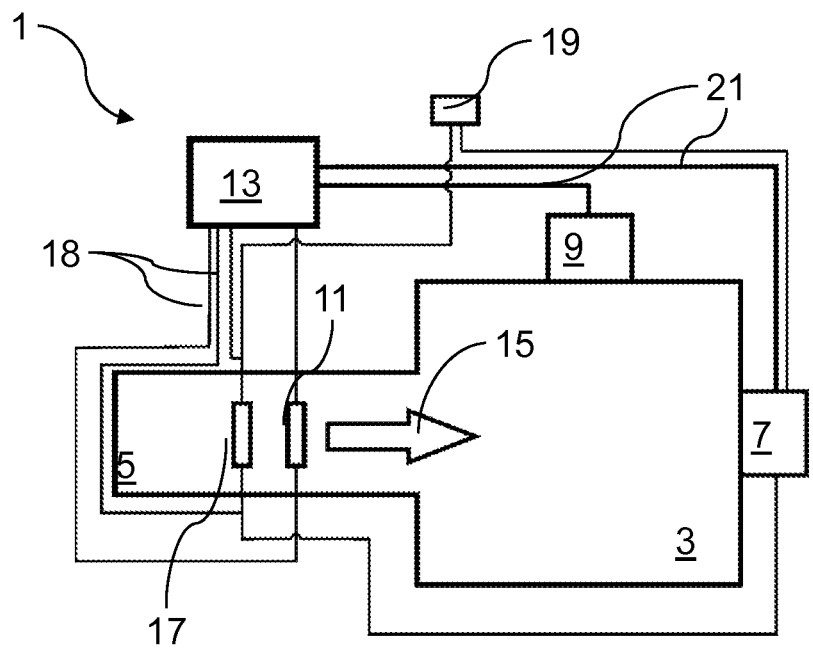
FIG. 1 is a schematic view of a first exemplary embodiment of a device according to the present invention for monitoring a mass or volume flow of a gas stream as part of a device for measuring a concentration of a gas in the gas stream.

Referring to the drawings in particular, an exemplary embodiment of a device 1 according to the present invention for monitoring a mass or volume flow of a gas stream, which is part of a device for measuring a concentration of a gas in the gas stream in a measuring chamber 3, with a feed line 5 and with a plurality of electrical components 7, 9, 11, 13 is described schematically with reference to FIG. 1. The feed line 5 is in fluidic connection with the measuring chamber 3. In other words, the feed line 5 is connected with the measuring chamber 3 such that a gas stream or a gas flow can flow from the feed line 5 into the measuring chamber 3. The view in FIG. 1 is only schematic and does not make it possible at all to infer the relative sizes of the different components of the device in relation to one another and the spatial arrangement and the embodiment in space thereof. In particular, the measuring chamber 3 may be, for example, merely a section of a feed line 5.

The plurality of the electrical components 7, 9, 11, 13 of the device comprises, among other things, a flow generator 7, a sensor element 9, a first heat-sensitive element 11 and a data processing unit 13. In the exemplary embodiment shown in FIG. 1, the flow generator 7 is a pump with a motor. The flow generator 7 generates a gas stream in a direction of flow 15 through the feed line 5 into the measuring chamber 3. The flow generator 7 is arranged behind the measuring chamber 3 in the direction of flow 15 and is operated in the suction mode. The feed line 5 has an opening, not shown, with which a gas mixture can be drawn in from a measuring site.

The motor of the flow generator 7 is connected via a protective resistor 17, which limits the maximum power for the motor, with a power or voltage source 19. The protective resistor 17 is an electrical element 17 in the sense of the present invention, via which at least one of the electrical components 7, here in the form of the flow generator 7, is supplied with power. The protective resistor 17 is arranged in the feed line 5 such that a waste heat of the protective resistor 17 heats the gas stream flowing through the feed line 5. The protective resistor 17 is thus advantageously cooled, whereas additional measures are sometimes necessary for this purpose in devices known from the state of the art.

The power or voltage source 19 may be formed, for example, by one or more batteries if the device 1 is a portable or mobile device. However, it may just as well as be a network adapter, which supplies the flow generator 7 with power. The other electrical components 9, 11, 13 are also supplied by the power or voltage source 19 in the exemplary embodiment shown in FIG. 1. The supply lines necessary for this are not shown for clarity's sake. It is just as well conceivable that one or more of the other electrical components 9, 11, 13 are supplied by one or more other power or voltage sources.

The sensor element 9 is arranged such that it can measure or determine the concentration of at least one gas in the gas stream generated by the flow generator 7 in the measuring chamber 3. The sensor element 9 may be arranged, in principle, directly in the measuring chamber 3. In the schematic view in FIG. 1, the sensor element 9 is arranged outside the measuring chamber 3 and measures the concentrations of at least one gas, for example, based on an optical method, the radiation being coupled and uncoupled for this in the measuring chamber 3, for example, through a window in an outer wall of the measuring chamber 3.

The first heat-sensitive element 11 is arranged in the feed line 5. The first heat-sensitive element 11 is arranged behind the protective resistor 17 in the direction of flow 15 and is set up to detect a temperature of the gas stream heated by the electrical element 17. In the exemplary embodiment shown in FIG. 1, this means that the first heat-sensitive element 11 is arranged between the electrical elements 17 and the measuring chamber 3. The first heat-sensitive element 11 is, for example, a thermal resistor, whose electrical resistance changes as a function of the temperature of the thermal resistor. The first heat-sensitive element 11 is connected in the exemplary embodiment shown in FIG. 1 with the data processing unit 13, which detects the voltage drop over the heat-sensitive element 11 and determines from this a temperature of the thermal resistor or of the heat-sensitive element 11. The first heat-sensitive element 11 could just as well be a barretter or a thermocouple. It is also possible that the heat-sensitive element 11 itself comprises a data processing unit and outputs a temperature of the gas stream in the feed line 5 to the data processing unit 13 via a data line.

The data processing unit 13 is connected with the flow generator 7 and the sensor element 9 via data lines 21 and is set up to determine a mass or volume flow of the gas stream from the temperature detected by the first heat-sensitive element 11. In the exemplary embodiment, the data processing unit 13 determines the actual mass or volume flow and outputs this, for example, via a display unit, not shown. However, it is also conceivable that the data processing unit 13 only checks whether the mass or volume flow in the feed line 5 is not below a minimum mass or volume flow and sends an alarm via a display or warning unit, not shown, when the actual mass or volume flow is below the minimum mass or volume flow.

The effective heat output of the electrical element 17 as well as the temperature of the gas stream before and after contact with the electrical element 17 are needed to calculate or estimate the mass or volume flow. To determine the effective heat output of the electrical element 17, a measuring line 18 is provided, by means of which the data processing unit 13 can determine a voltage drop over the electrical element 17 and infer the effective heat output from this. The temperature difference can be determined by different methods. A second heat-sensitive element 27, which will be discussed below, is used in addition to the first heat-sensitive element 11 in the simplest case. Pulsating operation of the flow generator 7 and hence also of the heat output of the electrical element 17 is possible as an alternative. The temperature of the first heat-sensitive element 11 may also be used as an approximate reference for short measurements, for example, within the framework of a release measurement. The mass or volume flow can be calculated from this in the knowledge of the cross section of the feed line 5 and by approximation for the heat capacity of the gas.

The device 1 according to the present invention is advantageous, because no additional heating element is needed to heat the gas stream in the feed line 5, but the waste heat of the electrical element 17 in the form of a protective resistor 17 of the motor of the flow generator 7, which is necessary anyway, is used. Not only is the number of components that are needed to manufacture the device 1 thus advantageously reduced, but less electrical energy is also consumed, because no additional heating element needs to be operated. Not only is the lower energy consumption of the device advantageous from an ecological point of view, but it also makes it possible to prolong the operating time in case of mobile or portable devices that are operated with batteries. As an alternative, it is also possible to use lighter batteries or batteries with a lower capacity, without reducing the operating time of the device. The weight of the device can thus be advantageously reduced. Moreover, the protective resistor 17 is cooled, whereas additional measures must be taken for this in devices known from the state of the art.

Figure 2:
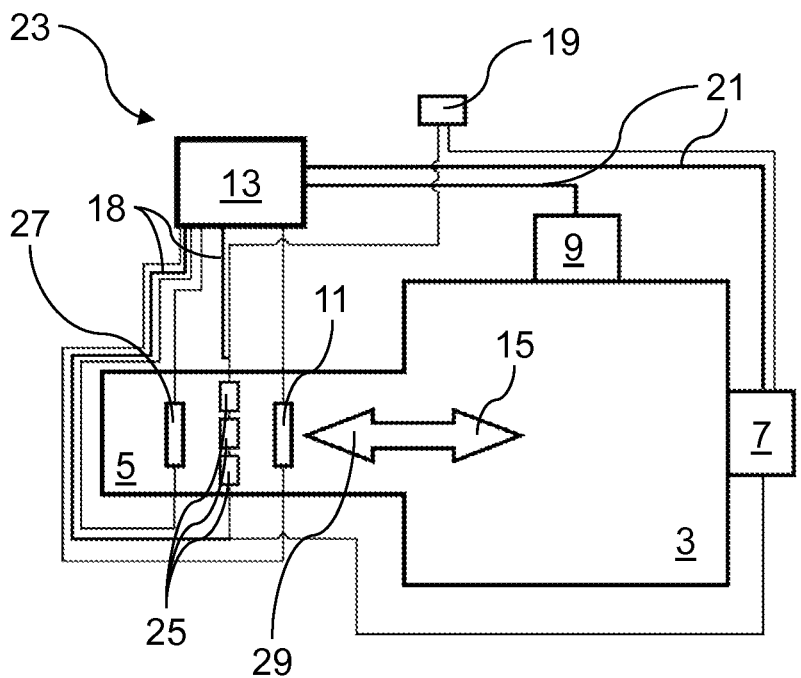
FIG. 2 is a schematic view of a second exemplary embodiment of a device according to the present invention for monitoring a mass or volume flow of a gas stream as part of a device for measuring a concentration of a gas in the gas stream.

FIG. 2 shows an alternative embodiment of a device 23 for monitoring a mass or volume flow, which is likewise a part of a device for measuring a concentration of a gas in a gas stream. The device 23 differs from the device 1 that is shown in FIG. 1 in a few features only. Only these features will be discussed below. Reference is made to the description of the device 1 from FIG. 1 with respect to the other features. The same reference numbers as in FIG. 1 are used in FIG. 2 if they designate the same elements.

The device 23 shown in FIG. 2 meets the specifications of explosion protection class "ia," because it is intrinsically safe even in case of two errors. The power that is taken up by the motor of the flow generator 7 from the power or voltage source 19 is limited by means of three protective resistors 25 for this. These three protective resistors 25 are arranged as electrical elements 25 in the feed line 5, specifically in front of the first heat-sensitive element 11 in the direction of flow. The first heat-sensitive element 11 is arranged here and also set up here to detect a temperature of the gas stream heated by the three protective resistors 25. The first heat-sensitive element 11 is designed and the temperature is detected by the first heat-sensitive element 11 in the exemplary embodiment shown in FIG. 2 analogously to the exemplary embodiment shown in FIG. 1.

The device 23 comprises, furthermore, a second heat-sensitive element 27, which is arranged in front of the electrical elements 25 in the feed line 5 in the direction of flow 15. The second heat-sensitive element 27 is arranged in the exemplary embodiment shown in FIG. 2 on the side of the protective resistors 25 that points away from the measuring chamber 3, i.e., between an opening, not shown, for drawing in a gas from a measuring site, and the electrical elements 25, in the feed line 5. A temperature of the gas stream can be detected with the second heat-sensitive element 27 before this gas stream has been heated by the waste heat of the electrical elements 25. The temperature is detected here in the same manner as the temperature of the gas stream with the first heat-sensitive element 11.

Besides the advantages of device 1, the device 23 according to the present invention has the advantage that the mass or volume flow in the feed line 5 can be determined with a higher accuracy, because not only the temperature of the gas stream behind the electrical elements 25 in the direction of flow 15 is known, but also the temperature difference by which the gas stream has been heated by the waste heat of the electrical elements 22 between the second heat-sensitive element 27 and the first heat-sensitive element 11. In addition, the direction in which the gas stream flows can also be determined from the temperature difference between the two heat-sensitive elements 11, 27.

In an especially preferred embodiment, the device 23 may be operated with two different directions of flow 15, 29. A correspondingly suitable flow generator 7, which can be operated in both pumping operation and suction operation, is necessary for this. As an alternative, an unintended, erroneous and possibly harmful reverse flow can be recognized. It should be noted in this connection that depending on the direction of flow 15, 29, the heat-sensitive elements 11, 27 possibly assume each other's role. In case of a corresponding continued direction of flow 29, the heat-sensitive element 27 assumes the task of the first heat-sensitive element, because it is arranged behind the electrical elements 25 in the direction of flow 29, whereas the heat-sensitive element 11 assumes the task of the second heat-sensitive element, because it is arranged in front of the electrical elements 25 in the direction of flow 29. In other words, the heat-sensitive element 27 detects a temperature of the gas stream heated by the waste heat of the electrical elements 25, while the heat-sensitive element 11 detects the temperature of the gas stream before this gas stream is heated by the waste heat of the electrical elements 25.

The preferred embodiment therefore has, in addition to the advantages mentioned already, an especially high degree of flexibility in use, because it can be operated with different directions of flow 15, 29 or can recognize erroneous operation.

Figure 3:
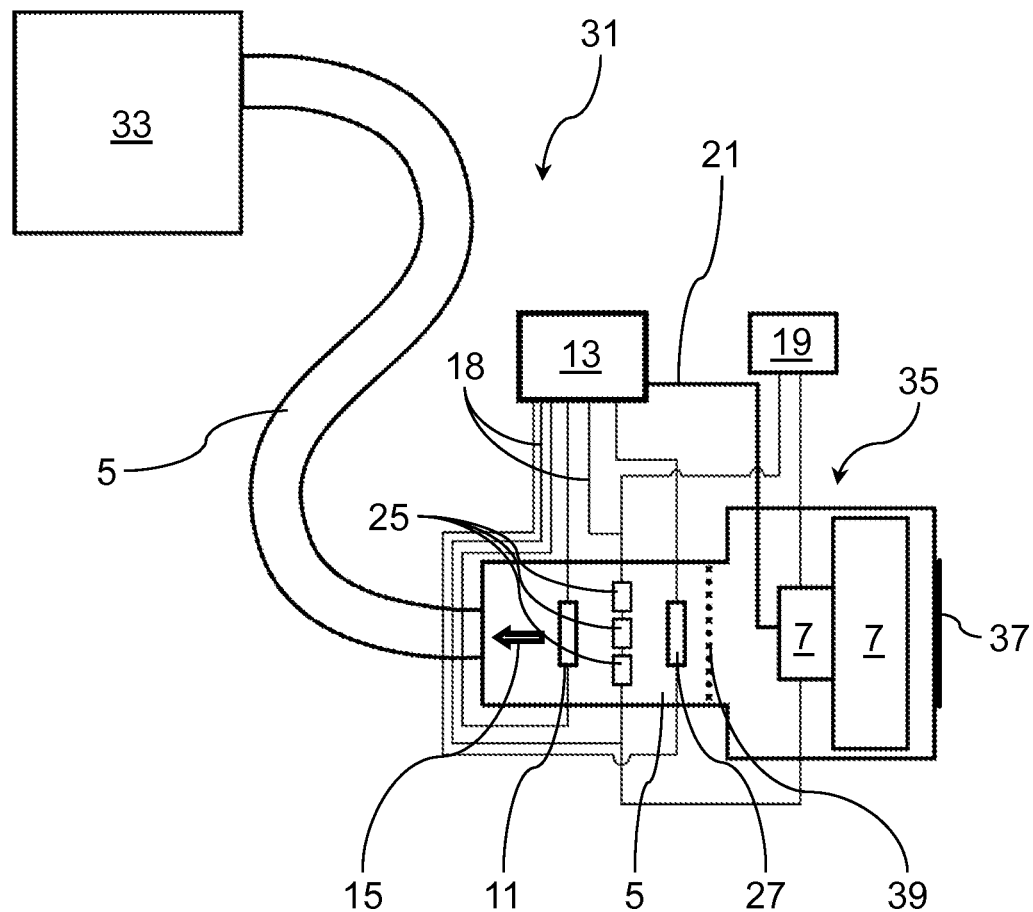
FIG. 3 is a schematic view of a third exemplary embodiment of a device according to the present invention for monitoring a mass or volume flow of a gas stream as part of a blower filter device.

FIG. 3 shows a third exemplary embodiment of a device according to the present invention for determining a mass or volume flow, which is part of a blower filter device 31. The same reference numbers are used for identical elements as in the preceding drawings in the schematic drawing of the blower filter device 31 as well. The blower filter device 31 is used to supply a user, who is in an environment in which the air surrounding the user contains unhealthy components, with filtered breathing air. The blower filter device has a gas mask or a breathing helmet 33 for this, via which a user can breath in ambient air purified from components that are hazardous to health.

The breathing helmet 33 is connected with a filter unit 35 via a feed line 5. The filter unit 35 comprises a plurality of electrical components 7, 11, 13, 27. One of the electrical components 7, 11, 13, 27 is a flow generator 7 in the form of a blower, which draws in ambient air through an intake opening 37 and generates a gas stream flowing in a direction of flow 15 in the feed line 5. Since the blower filter device likewise has the explosion protection class "ia," a motor of the flow generator 7 is connected with a power or voltage source 19 via three protective resistors 25 here as well, which represent electrical elements 25. Since blower filter devices 31 are usually worn on the body of the user, the power or voltage source 19 is usually formed by batteries.

Before the gas stream enters the feed line 5, it must pass through a filter 39, which filters elements that are hazardous to health out of the air drawn in. To ensure that the filter 39 is not clogged and a user receives a sufficient quantity of purified air, the blower filter device 31 comprises an exemplary embodiment of a device according to the present invention for determining a volume or mass flow of the gas stream generated by the flow generator 7 in the feed line 5. As this is already known from the second exemplary embodiment, the three protective resistors 25 are arranged for this as electrical elements 25 in the feed line 5. The electrical elements 25 have an especially good thermal coupling with the gas stream in the feed line 5. The protective resistors 25 limiting the power are thus advantageously cooled and the gas stream is heated without separate heating elements becoming necessary for this. The power consumption of the blower filter device 31 decreases markedly as a result and the operating time becomes considerably longer at equal size of the batteries 19.

Furthermore, a first heat-sensitive element 11 and a second heat-sensitive element 27 are arranged in the feed line. The first heat-sensitive element 11 is arranged behind the electrical elements 25 in the direction of flow 15, so that a temperature of the gas stream heated by a waste heat of the electrical elements 25 can be determined with it. The second heat-sensitive element 27 is arranged, by contrast, in front of the electrical elements 25 in the direction of flow 15, so that a temperature of the gas stream not yet heated by the waste heat of the electrical elements 25 can be determined with it.

The device comprises, furthermore, a data processing unit 13, which is connected with the other electrical components 7, 11, 27 and elements 25 of the device via data and measuring lines 18, 21. In particular, the data processing unit 13 is connected via measuring lines 18 with the protective resistors 25, via which it can determine a voltage drop over the protective resistors 25 and the effective heat output of said resistors herefrom. Furthermore, the data processing unit 13 is connected with the temperature-sensitive elements 11, 27 such that the temperature of the gas stream, determined at both temperature-sensitive elements 11, 27, is available for determining a volume or mass flow. The volume or mass flow is determined in the manner already described in detail for the preceding two exemplary embodiments.

The device according to the present invention thus makes it advantageously possible to monitor the volume or mass flow in a feed line 5 of a breathing helmet 33 of a blower filter device 31 and hence the state of the filter 39. The device according to the present invention is characterized especially by a low power consumption.

While specific embodiments of the invention have been shown and described in detail to illustrate the application of the principles of the invention, it will be understood that the invention may be embodied otherwise without departing from such principles.

APPENDIX

List of Reference Numbers

1 Device
3 Measuring chamber
5 Feed line
7 Flow generator
9 Sensor element
11 Heat-sensitive element
13 Data processing unit
15 Direction of flow
17 Electrical element/protective resistor
18 Measuring line
19 Power or voltage source 21 Data line
23 Device
25 Electrical elements/protective resistors
27 Second heat-sensitive element
29 Further direction of flow
31 Blower filter device
33 Breathing helmet
35 Filter unit
37 Intake opening
39 Filter

What is claimed is:

1. A device for monitoring a mass or volume flow of a gas stream, the device comprising:
a feed line;
a plurality of electrical components comprising at least one flow generator, a heat-sensitive element and a data processing unit, wherein:
the flow generator is arranged and set up such that the flow generator generates a gas stream flowing in a first direction of flow through the feed line and the flow generator comprises a motor with a plurality of electrical elements in the form of protective resistors;
the plurality of electrical elements are arranged in front of the heat-sensitive element in the feed line with respect to the first direction of flow;
the heat-sensitive element is arranged behind the electrical elements in the feed line with respect to the first direction of flow;
waste heat of the plurality of electrical elements heats the gas stream generated by the flow generator;
the heat-sensitive element is set up to detect a temperature of the gas stream generated by the flow generator and heated by the waste heat of the electrical elements; and
the data processing unit is set up to determine a mass or volume flow of the gas stream from the temperature detected by the heat-sensitive element.

2. A device in accordance with claim 1, wherein the heat-sensitive element is a first heat-sensitive element and further comprising:
a second heat-sensitive element, the second heat-sensitive element being arranged in front of the electrical element in the feed line with respect to the first direction of flow and is set up to detect a temperature of the gas stream not heated by the waste heat of the electrical element, wherein the data processing unit is set up to determine a prevailing direction of flow of the gas stream from the temperature detected by the first heat-sensitive element and detected by the second heat-sensitive element.

3. A device in accordance with claim 1, further comprising a measuring chamber, wherein:
the plurality of electrical components further comprise a sensor element, wherein the measuring chamber is in fluidic connection with the feed line and the flow generator is arranged and set up such that the gas stream flowing in the first direction of flow also flows through the measuring chamber; and
the sensor element is arranged at the measuring chamber and is set up to measure the concentration of at least one gas in the gas stream generated by the flow generator.

4. A device in accordance with claim 3, wherein the device is at least one of a gas measuring device and a gas warning device.

5. A device in accordance with claim 1, wherein the device is a blower filter device.

6. A device for monitoring a mass or volume flow of a gas stream, the device comprising:
a feed line;
a flow generator electrical component, the flow generator being arranged and configured to generate a gas stream flowing in the feed line at least in a first direction of flow through the feed line;
a heat-sensitive element;
a data processing unit electrical component, wherein:
the flow generator comprises a motor and a protective resistor;
the protective resistor is arranged in the feed line within the gas stream such that a waste heat of the protective resistor heats the gas stream generated by the flow generator;
the heat-sensitive element is arranged downstream of the protective resistor in the feed line with respect to the first direction of flow and within the gas stream;
the heat-sensitive element is configured to detect a temperature of the gas stream generated by the flow generator and heated by the waste heat of the protective resistor; and
the data processing unit is configured to determine a mass or volume flow of the gas stream from the temperature detected by the first heat-sensitive element.

7. A device in accordance with claim 6, wherein the heat-sensitive element is a first heat-sensitive element and further comprising:
a second heat-sensitive element, the second heat-sensitive element being arranged in front of the electrical element in the feed line with respect to the first direction of flow and is configured to detect a temperature of the gas stream not heated by the waste heat of the protective resistor with flow in the first direction of flow and to detect a temperature of the gas stream heated by the waste heat of the protective resistor with flow in a second, opposite direction of flow, wherein the data processing unit is configured to determine a prevailing direction of flow of the gas stream from the temperature detected by the first heat-sensitive element and detected by the second heat-sensitive element.

8. A device in accordance with claim 6, further comprising a measuring chamber, and
a sensor element, wherein the measuring chamber is in fluidic connection with the feed line and the flow generator is arranged and configured such that the gas stream flowing in the first direction of flow also flows through the measuring chamber; and
the sensor element is arranged at the measuring chamber and is configured to measure the concentration of at least one gas in the gas stream generated by the flow generator.

9. A device in accordance with claim 8, wherein the device is at least one of a gas measuring device and a gas warning device.

10. A device in accordance with claim 6, wherein the device is a blower filter device.

11. A device for monitoring a mass or volume flow of a gas stream, the device comprising:
a feed line;
a flow generator arranged and configured to generate a gas stream flowing in the feed line at least in a first direction of flow through the feed line, the flow generator comprising a motor and a plurality of protective resistors;
a heat-sensitive element; and
a data processing unit electrical component, wherein:

the plurality of protective resistors are arranged in the feed line within the gas stream such that a waste heat of the protective resistors heats the gas stream generated by the flow generator;

the heat-sensitive element is arranged downstream of the protective resistors in the feed line with respect to the first direction of flow and within the gas stream;

the heat-sensitive element is configured to detect a temperature of the gas stream generated by the flow generator and heated by the waste heat of the protective resistors; and the data processing unit is configured to determine a mass or volume flow of the gas stream from the temperature detected by the first heat-sensitive element.

12. A device in accordance with claim 11, further comprising:

a measuring chamber; and a sensor element, wherein the measuring chamber is in fluidic connection with the feed line and the flow generator is arranged and configured such that the gas stream flowing in the first direction of flow also flows through the measuring chamber; and the sensor element is arranged at the measuring chamber and is configured to measure the concentration of at least one gas in the gas stream generated by the flow generator.

* * * * *